United States Patent [19]
Shimada et al.

[11] Patent Number: 5,748,175
[45] Date of Patent: May 5, 1998

[54] LCD DRIVING APPARATUS ALLOWING FOR MULTIPLE ASPECT RESOLUTION

[75] Inventors: Takayuki Shimada, Yamatokoriyama; Yasunobu Akebi, Yamabe-gun; Yutaka Takafuji, Nara, all of Japan

[73] Assignee: Sharp Kabushiki Kaisha, Osaka, Japan

[21] Appl. No.: 523,444

[22] Filed: Sep. 5, 1995

[30] Foreign Application Priority Data

Sep. 7, 1994 [JP] Japan .................................. 6-213962

[51] Int. Cl.$^6$ .................................................. H04N 3/27
[52] U.S. Cl. .................................. 345/127; 348/556
[58] Field of Search ................................ 345/132, 127; 348/552, 554–558; 395/327

[56] References Cited

U.S. PATENT DOCUMENTS

| | | | |
|---|---|---|---|
| 5,157,386 | 10/1992 | Uchida et al. | 340/784 |
| 5,357,290 | 10/1994 | Horibe | 348/792 |
| 5,406,308 | 4/1995 | Shiki | 345/127 |
| 5,414,443 | 5/1995 | Kanatani et al. | 345/95 |
| 5,448,260 | 9/1995 | Zenda et al. | 345/100 |
| 5,581,273 | 12/1996 | Yoneda et al. | 345/90 |

FOREIGN PATENT DOCUMENTS 3-131182  6/1991  Japan .

*Primary Examiner*—Mark R. Powell
*Attorney, Agent, or Firm*—Nixon & Vanderhye, P.C.

[57] ABSTRACT

A display device includes a gate driver for supplying a corresponding scanning signal to a plurality of scanning signal lines, a source driver for receiving an image signal, extracting an image data from the image signal and supplying the corresponding image data to a plurality of data signal lines, and a display section for displaying the image data based on the scanning signal. The plurality of scanning signal lines is classified into a predetermined first group and a second group. The gate driver supplies a corresponding second scanning pulse signal to scanning signal lines of the predetermined first group and supplies a non-selection signal to scanning signal lines of the predetermined second group based on the sampling control signal when the control signal is in a second state.

20 Claims, 11 Drawing Sheets

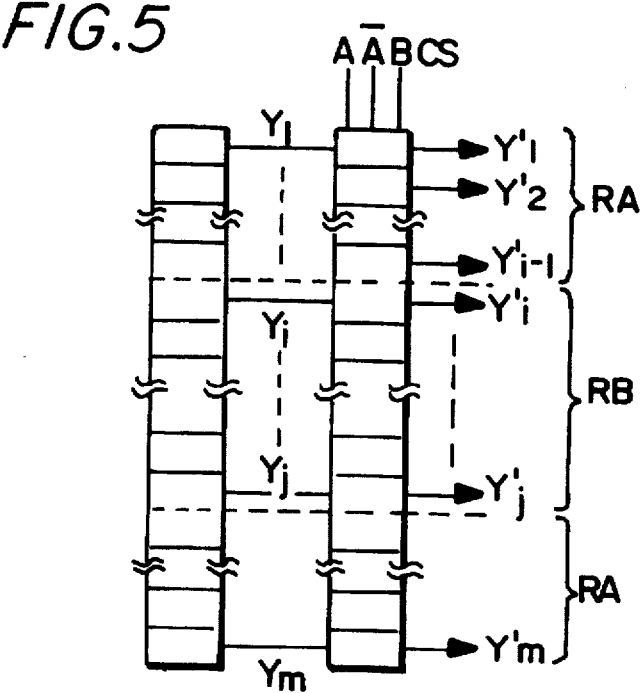

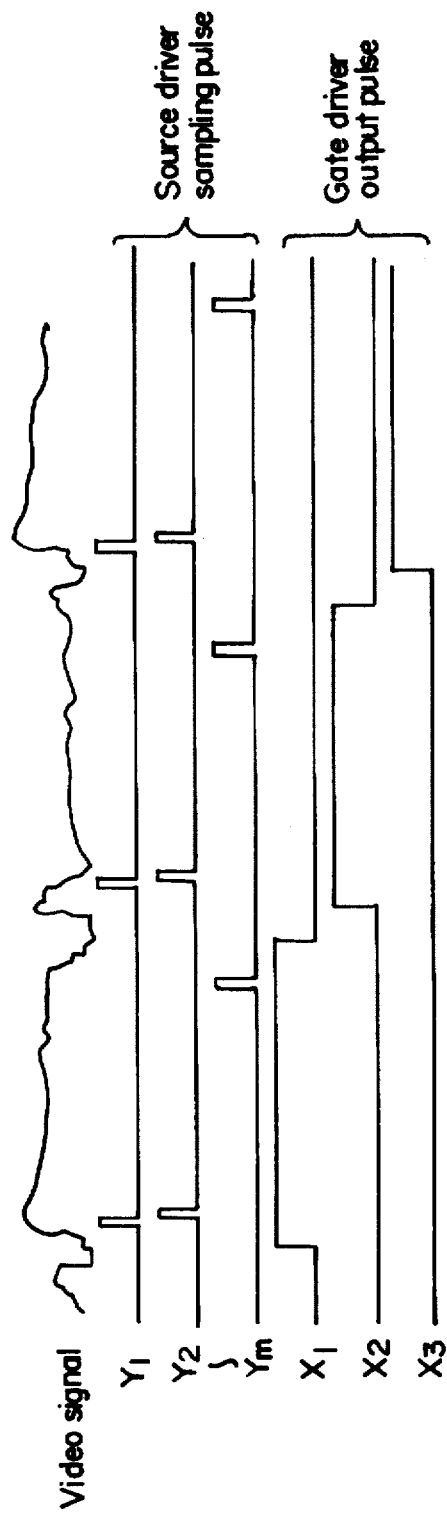
FIG. 7A Driving timing by mode A
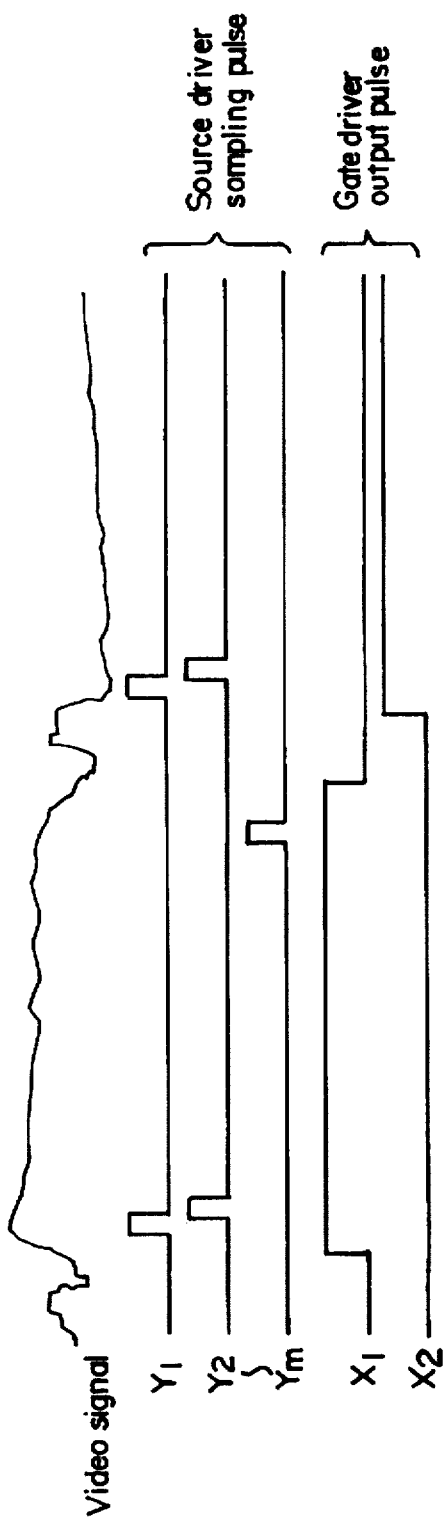
FIG. 7B Driving timing by mode B Area A Area B

FIG.11A   In the case the control signal CS is state A
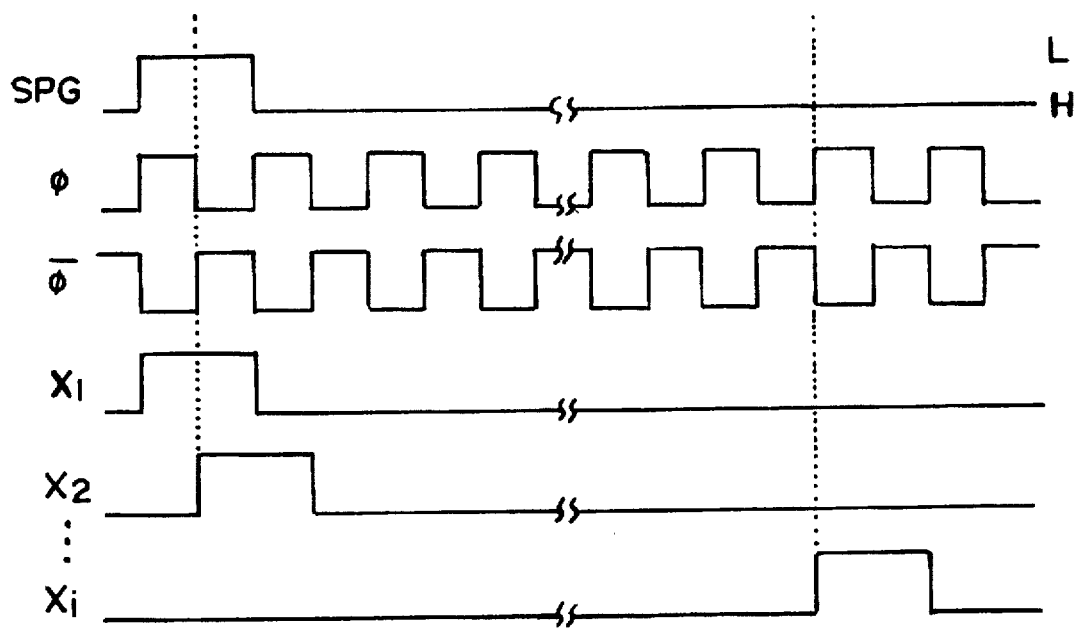
FIG.11B   In the case the control signal CS is state $\overline{A}$
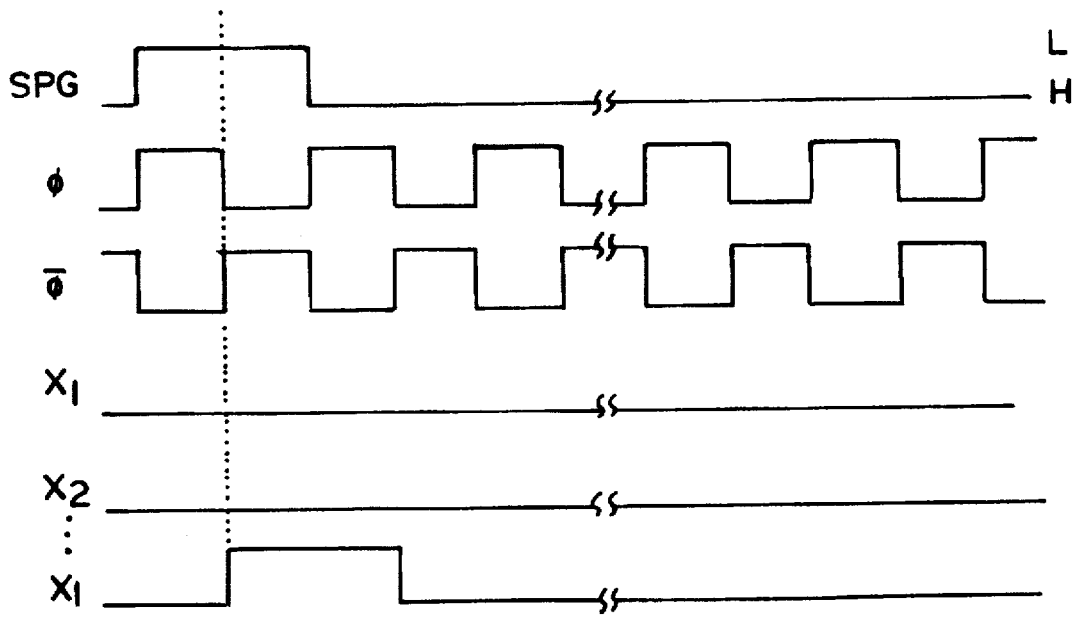

5,748,175

LCD DRIVING APPARATUS ALLOWING FOR MULTIPLE ASPECT RESOLUTION

BACKGROUND OF THE INVENTION

1. Field of the Invention

The present invention relates to drivers and a display device. More specifically, the present invention relates to a display device allowing for a display of the video signals in a plurality of display modes, in which different number of pixels are arranged in the column and the row directions, in a signal display panel by switching the operations of the drivers.

2. Description of the Related Art

FIG. 1 shows an exemplary configuration of a conventional liquid crystal display device. In FIG. 1, reference numeral 100 denotes a liquid crystal display device using a conventional active matrix substrate. The liquid crystal display device includes a scanning signal driver 104 and a data driver 105, both of which are integrally formed on the substrate. On this active matrix substrate, pixel TFTs (thin-film transistors) 103 are formed so as to correspond to pixels 107 arranged in a matrix fashion. Moreover, data signal lines (data bus lines) 102 for supplying data signals to the pixels 107, and scanning signal lines 101 for supplying control signals to the pixel TFTs 103 are provided on the substrate. Each of the data bus lines 102 is connected to the ground level via a capacitor 109.

The source of each pixel TFT 103 is connected to the corresponding data signal line 102. The gate thereof is connected to the corresponding scanning signal line 101. A pixel capacitor 106 is connected to the drain electrode of the pixel TFT 103. Liquid crystal included in the pixel 107 herein functions as a capacitor connected in parallel to the pixel capacitor 106. One terminal of each pixel capacitor 106 is grounded through a pixel capacitor common line 110 together with the counter electrode on the counter substrate.

The scanning signal driver 104 includes a shift register where the outputs at respective stages are connected to the respective scanning signal lines, and outputs ON/OFF control signals for the pixel TFTs 103 to the scanning signal lines 101. The data driver 105 includes an analog switch 111 connected between a video signal input line 108 and the data signal line (data bus line) 102 and a shift register 105a for turning the analog switch 111 ON/OFF, and supplies a data signal to the data bus lines 102.

In these days, not only a conventional television having a screen with an aspect ratio of 4:3, but also a wide television having a screen with an aspect ratio of 16:9, a HDTV (high definition television) in particular, have become more and more popular. Reflecting such a trend, a demand for a display device capable of displaying televised images on a screen in accordance with a plurality of modes has been increasing. It has also become common to use a display device as an information terminal device by connecting the display device to a computer or the like. In such a case, the computers are used in various manners, so that a variety of standards for a VGA (Video Graphic Array), an XGA (Extended Video Graphic Array), and an EWS (Engineering Work Station) and the like currently coexist. As a result, in order to use a display device as such an information terminal device, a display device capable of displaying images by selecting the modes corresponding to the respective standards has also become more and more necessary.

Japanese Laid-Open Patent Publication No. 3-131182 discloses a display device using a matrix type display panel for performing a display in a plurality of modes. In this display device, the time axis of input video signals is modulated, and video signals having a signal period at a predetermined level corresponding to a marginal area are formed in the first part and the last part of an effective scanning period corresponding to one column of a video signal (or one scanning line). In this manner, right and left side portions of a display section are used as marginal areas. Thus, it is possible to perform two different kinds of displays at respectively different aspect ratios.

However, the method disclosed in Japanese Laid-Open Patent Publication No. 3-131182 has a problem in that the configuration of the external driver for the display device is disadvantageously complicated because the time axis of the video signal is required to be modulated.

SUMMARY OF THE INVENTION

A driving circuit for sequentially scanning a plurality of scanning signal lines according to the present invention includes a shift register having a plurality of unit registers and nodes, each of the plurality of unit registers being connected to the corresponding scanning signal line, a start signal input to the node being sequentially shifted to an adjacent unit register based on a standard signal, the unit register connected to the node being allowed to be in a non-operational state based on a first state of a control signal, the start signal input to the node being output from the node based on a second state of the control signal.

According to another aspect of the invention, a diving circuit for driving or controlling a plurality of scanning signal lines and a plurality of sampling gates for sampling a data signal includes a shift register having a plurality of unit registers, the plurality of unit registers being connected to the corresponding scanning signal lines or the corresponding sampling gates, a start signal being stored in the unit register to which the start signal is input via a node, the start signal being shifted from the unit register adjacent to the unit register in which the start signal is stored based on a standard signal; and a logic gate array for receiving a holding signal which each unit register of the shift register holds, and outputting the holding signal to a buffer as a scanning signal or a sampling gate control signal, the logic gate array outputting the signal output from the unit resister to a buffer in a logic gate receiving a signal output from the unit register to which the start signal is shifted, and outputting a signal to the buffer in a logic gate receiving a signal output from the unit register to which the start signal is not shifted.

According to still another aspect of the invention, a display device includes: a display portion having a plurality of scanning signal lines and plurality of data signal lines arranged so as to cross the plurality of scanning signal lines, and displaying an image by applying a voltage to an intersecting portion between the scanning signal line and the data signal line; a scanning signal driving circuit for sequentially scanning the plurality of scanning signal lines; a data driving circuit for sequentially driving the plurality of data signal lines. At least one of the scanning signal driving and the data driving is controlled by a display switching signal, and marginal areas of a display screen is made to be blank regions by the display switching.

According to still another aspect of the invention, a diving circuit for driving and controlling a plurality of scanning signal lines in a display device and a plurality of sampling gates for sampling a data signal in the display device includes: a decoder having a plurality of output nodes and outputting a signal to a predetermined output node based on a plurality of input signals; and a logic gate array for receiving a signal from each output node in the decoder and outputting the signal to a buffer as a scanning signal or a sampling gate control signal.

According to still another aspect of the invention, a display device includes a plurality of scanning signal lines being classified into a predetermined first group and a predetermined second group; a plurality of data signal lines being classified into a predetermined first group and a predetermined second group; a gate driver for receiving a first control signal, for further receiving a first sampling control signal during a vertical blanking period of the image signal, for supplying a corresponding first scanning pulse signal to the plurality of scanning signal lines when the first control signal is in a first state, for supplying a corresponding second scanning pulse signal to the scanning signal lines of the predetermined first group and supplying a non-selection signal to the scanning signal lines of the predetermined second group based on the first sampling control signal when the first control signal is in a second state; and a source driver for receiving a second control signal; further receiving a second sampling control signal during a horizontal blanking period of the image signal; supplying a corresponding first data pulse signal to the plurality of data signal lines when the second control signal is in a first state; supplying a corresponding second data pulse signal to the data signal lines of the predetermined first group; and supplying a marginal signal to the data signal lines of the predetermined second group based on the data control signal when the second control signal is in a second state; and wherein a width of the first scanning pulse signal is shorter than a width of the second scanning pulse signal; and wherein a width of the first data pulse signal is shorter than a width of the second data pulse signal.

According to still another aspect of the invention, a display device includes a gate driver for supplying a corresponding signal to a plurality of scanning signal lines, a source driver for receiving an image signal, extracting an image data from the image signal and supplying the corresponding image data to a plurality of data signal lines, and display means for displaying the image data based on the signal, wherein the plurality of scanning signal lines is classified into a predetermined first group and a predetermined second group, the gate driver receives a control signal and further receives a sampling control signal during a vertical blanking period of the image signal, the gate driver supplies a corresponding first scanning pulse signal to the plurality of scanning signal lines when the control signal is in a first state, the gate driver supplies a corresponding second scanning pulse signal to scanning signal lines of the predetermined first group and supplies a non-selection signal to scanning signal lines of the predetermined second group based on the sampling control signal when the control signal is in a second state, and a width of the first scanning pulse signal is shorter than a width of the second scanning pulse signal.

According to still another aspect of the invention, a display device includes a gate driver for supplying a corresponding scanning signal to a plurality of scanning signal lines, a source driver for receiving an image signal, extracting a data from the image signal and supplying the corresponding data to a plurality of data signal lines, and display means for displaying the data based on the scanning signal, wherein the plurality of data signal lines is classified into a predetermined first group and a predetermined second group, the source driver receives a control signal and further receives a sampling control signal during a horizontal blanking period of the image signal, the source driver supplies a corresponding first data pulse signal to the plurality of data signal lines when the control signal is in a first state, the source driver supplies a corresponding second data pulse signal to scanning signal lines of the predetermined first group and supplies a marginal signal to data signal lines of the predetermined second group based on the data control signal when the control signal is in a second state, and a width of the first data pulse signal is shorter than a width of the second data pulse signal.

According to the present invention, the shift register included in the scanning signal driver or the data driver has a configuration in which the node to which the start signal is input is set by a control signal, the operation of the unit register immediately before the set node can be interrupted by the control signal, and the control signal can switch either or both of the start position and the termination position of the shift operation. As a result, in the shift register of the invention, the dimension of the marginal area on the display screen can be varied by shifting a selection signal from one terminal side to the other terminal side through the scanning signal line and the data signal line. Thus, an image in a plurality of display modes which are different in the number of pixels arranged in the row direction and the column direction can be displayed in accordance with the display modes of the data signal without modulating the time axis of the data signal.

More specifically, with respect to the video signal for an image to be displayed on a large-scale display screen, the shift operation is performed through the entire range of the shift register, while with respect to the video signal for an image to be displayed on a small-sized display screen, the shift operation is performed in a limited range of the shift register. As a result, a marginal area of a desired size can be formed in the upper and lower end portions or the right and left side portions of the display section without modulating the time axis of the data signal, thereby switching a plurality of display modes each having a predetermined aspect ratio or a display capacitance.

According to the present invention, at least one of the scanning signal driver and the data driver is controlled by a display switching signal. By switching the display in this way, the peripheral portions on the display screen can be used as marginal areas. As a result, with respect to a video signal for an image to be displayed on a large-scale display screen, the image is displayed in the entire portion of the display screen. On the other hand, with respect to a video signal for an image to be displayed on a small-sized display screen, the image is displayed in a limited range of the display screen, excluding the peripheral portions of the display screen to be used as marginal areas. Thus, marginal areas of a desired size can be formed in the upper and lower end portions and the right and left side portions of the display section without modulating the time axis of the data signals, thereby switching a plurality of display modes each of which has a predetermined aspect ratio or a display capacitance.

A display device according to the present invention includes a decoder having a plurality of output nodes and outputting a signal to a predetermined output node based on a plurality of input signals, and a logic gate for receiving the signal from each output node of the decoder so as to output the signal to a buffer as a scanning signal or a sampling gate control signal In the logic gate, the decoding output is output to the buffer without performing any processing, in the region of the decoder where the decoding output to each output node is sequentially switched, while either one of the decoding output or another different signal is output to the buffer based on the control signal, in the region of the decoder where the decoding output to each output node is constant. As a result, an image in a plurality of display modes which are different in the number of pixels arranged in the row direction and the column direction can be displayed in accordance with the display modes of the data signal without modulating the time axis of the data signal.

Thus, the invention described herein makes possible the advantage of providing drivers and a display device capable of displaying an image in a plurality of display modes which are different in the number of pixels arranged in the column and the row directions in accordance with the display mode of the data signal without modulating the time axis of the data signal.

This and other advantages of the present invention will become apparent to those skilled in the art upon reading and understanding the following detailed description with reference to the accompanying figures.

BRIEF DESCRIPTION OF THE DRAWINGS

FIG. 5 is a diagram showing a circuit configuration of a shift resister included in a data driver of the display device of the first example.

FIG. 7A is a timing chart showing driving timings in a mode A in the display device of the first example.

FIG. 7B is a timing chart showing driving timings in a mode B in the display device of the first example.

FIGS. 11A and 11B are timing charts of an output signal $X_1$, a start signal SPG and a clock signal $\phi$ ($\phi$ bar).

DESCRIPTION OF THE PREFERRED EMBODIMENTS

Example 1

Figure 2A:
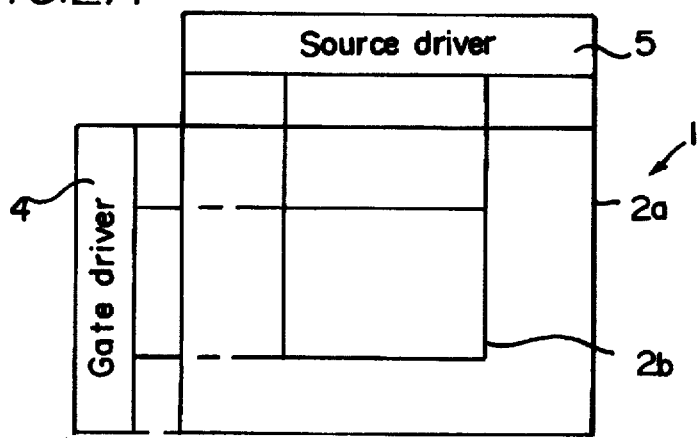
FIG. 2A is a diagram schematically showing a display state in a display device of a first example according to the present invention.
Figure 2B:
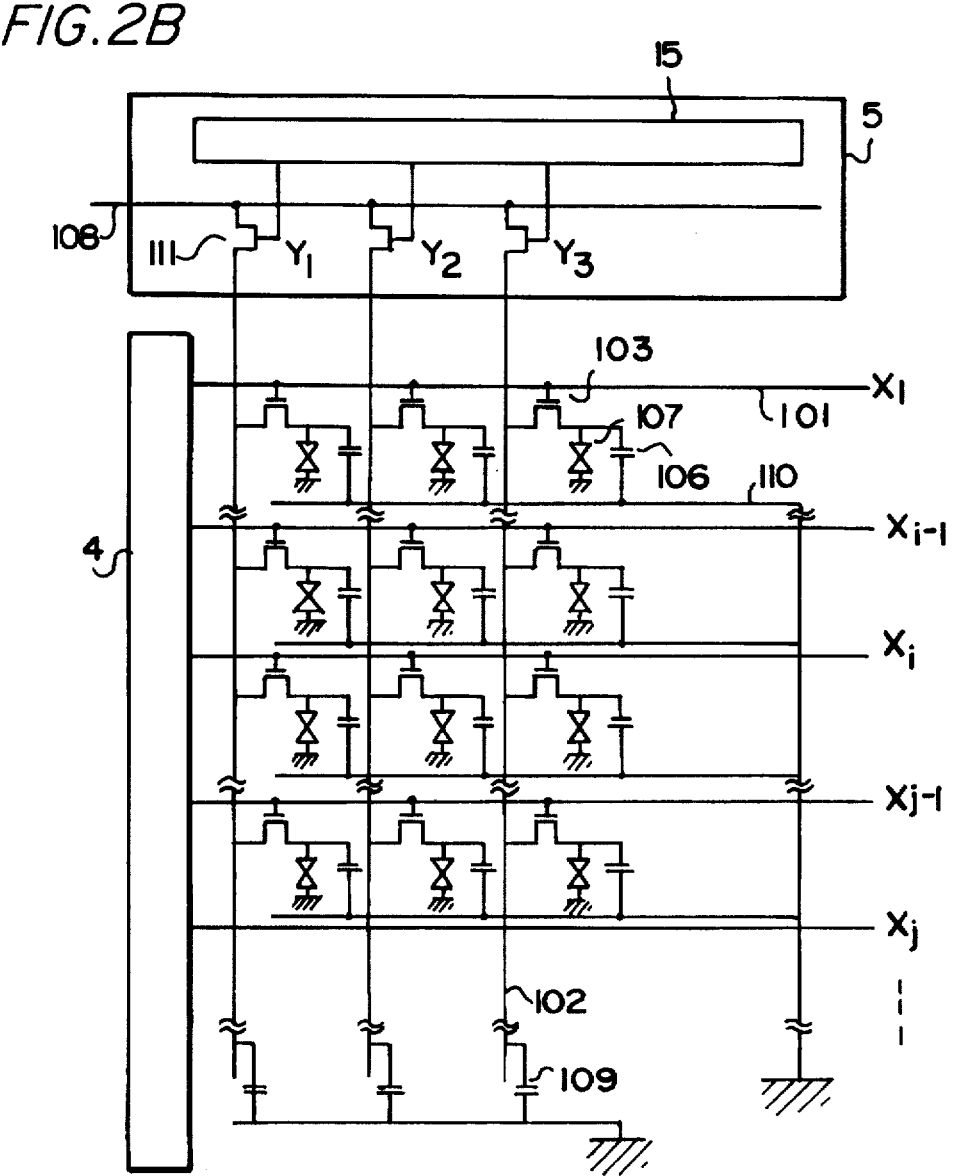
FIG. 2B is a diagram showing a circuit of the display device of the first example according to the present invention.

FIGS. 2A and 2B are diagrams illustrating a liquid crystal display device of a first example according to the present invention. FIG. 2A is a diagram schematically showing an area in which an image is displayed in a plurality of display modes by the liquid crystal display device. FIG. 2B shows a configuration of the liquid crystal display device.

In FIGS. 2A and 2B, reference numeral 1 denotes a liquid crystal display device of this example, and an area $2a$ is an area where an image is displayed on a display section by using a data signal in a display mode using a larger number of pixels (hereinafter, referred to as a mode A). An area $2b$ is an area where an image is displayed on the display section by using a data signal in a display mode using a smaller number of pixels (hereinafter, referred to as a mode B). For example, in the case where the liquid crystal display device of the present invention is used as an information terminal device, the image displayed in the area $2a$ by using the data signal in the mode A has high resolution, while the image displayed in the area $2b$ by using the data signal in the mode B has low resolution. Hereinafter, this example will be described as being applied to the mode B where a smaller number of pixels are arranged both in the column direction and the row direction as compared with the mode A. However, needless to say, this example is applicable to the mode B where the number of the pixels is smaller either in the column direction or the row direction as compared with the mode A.

Figure 1:
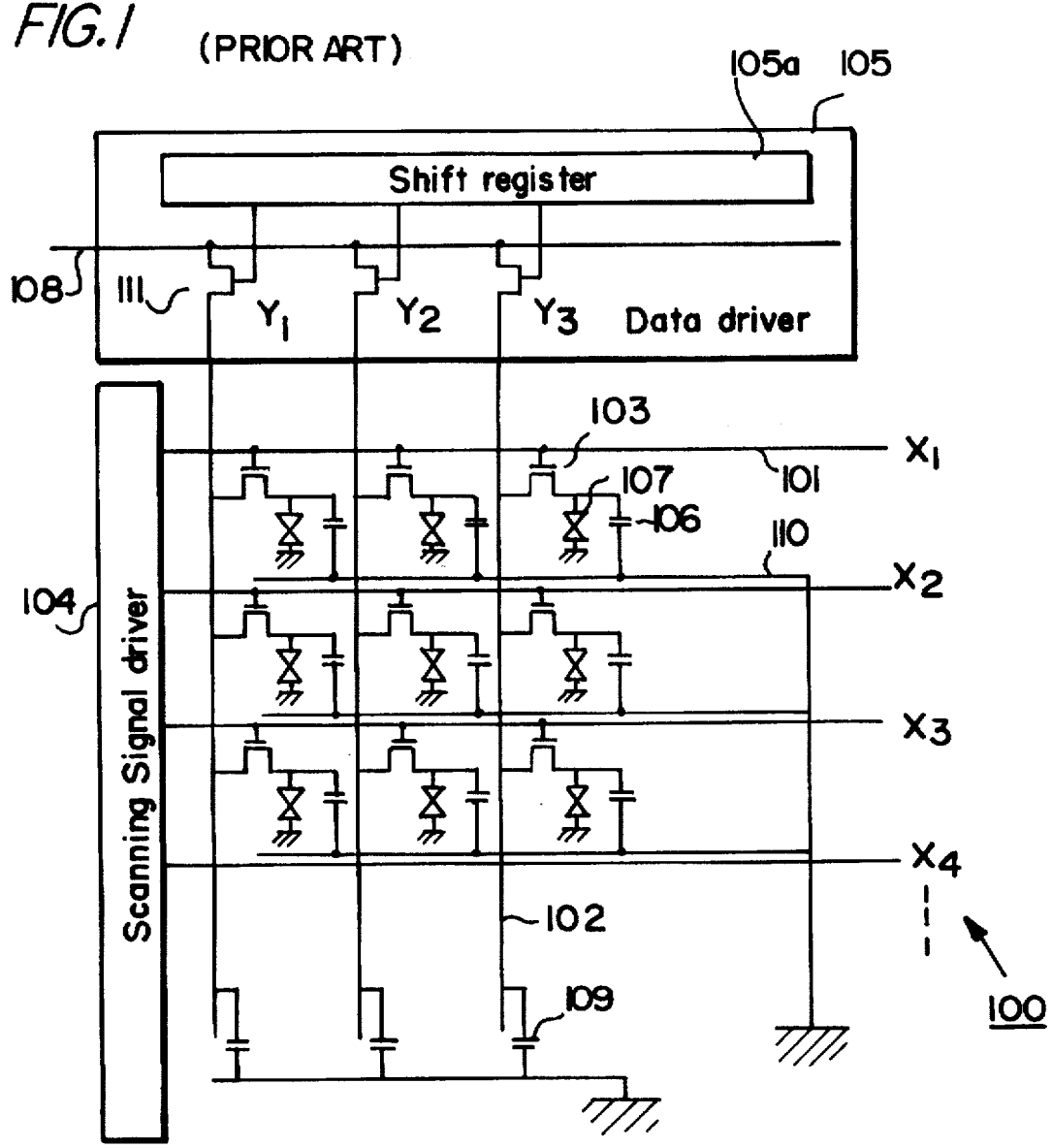
FIG. 1 is a diagram showing a configuration of a liquid crystal display device using a conventional active matrix substrate.

A gate driver 4 includes a shift register 14 (not shown in FIGS. 2A and 2B), a logic gate and a buffer. Output signals from the gate driver 4 are supplied to scanning signal lines 101 within the display section via the logic date and the buffer. A source driver 5 includes a circuit 15 and analog switches 111. Output signals output from the circuit 15 function as switching control signals for the analog switches 111 connected to a video signal line 108 and a data signal lines 102. The same reference numerals as those in FIG. 1 denote the same components as those of a conventional liquid crystal display device.

Figure 3:
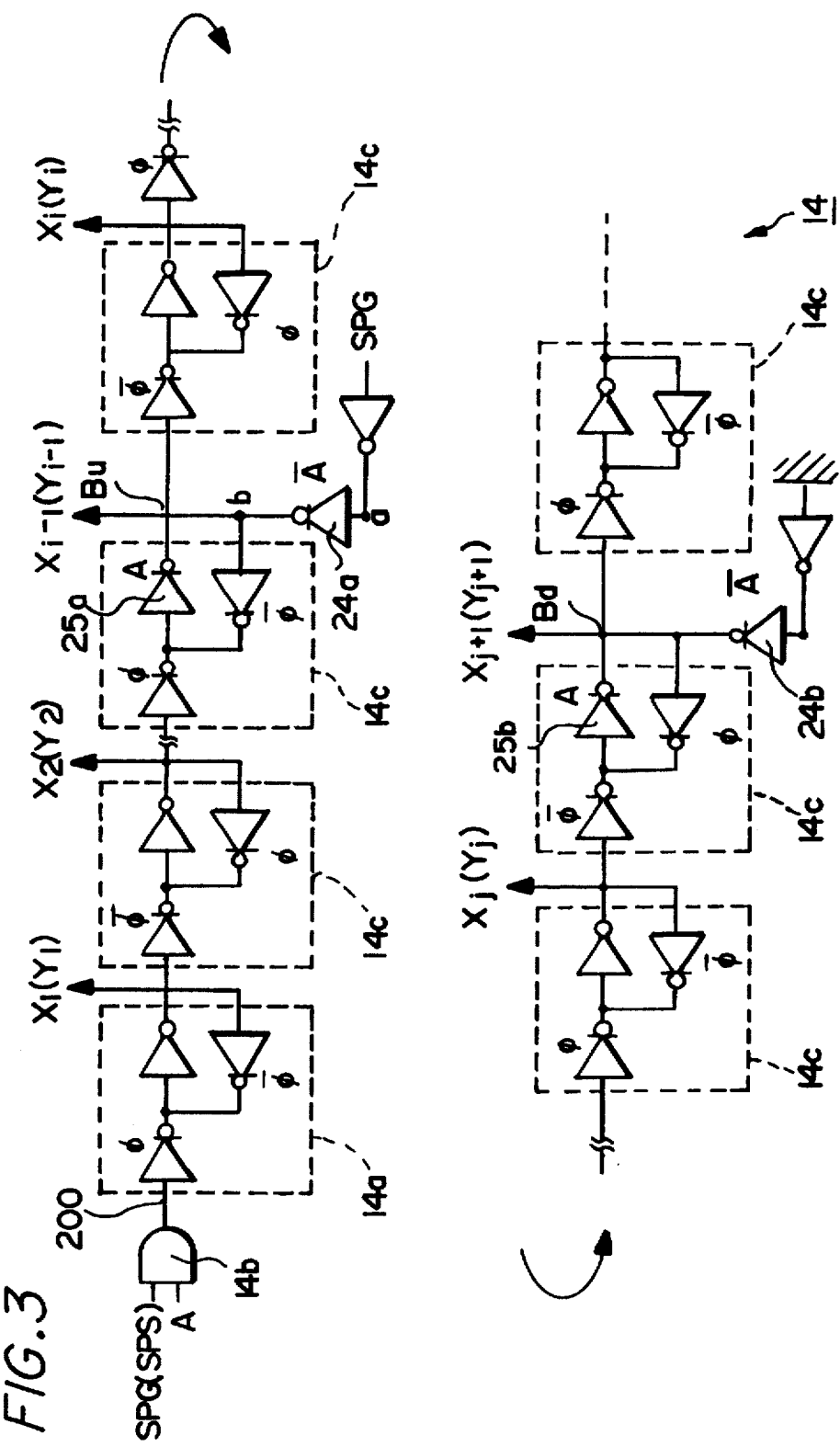
FIG. 3 is a diagram showing a circuit configuration of a shift resister included in a scanning signal driver of the display device of the first example.

An exemplary configuration of the shift register 14 will be described below. FIG. 3 is a diagram showing in detail a configuration of the shift register 14.

In FIG. 3, the shift register 14 includes a plurality of unit registers $14a$ and $14c$, each of which is connected to the scanning signal line 101 (not shown in FIG. 3). The unit registers $14a$ and $14c$ are constructed by using quasi-static D-flip flops. The shift register 14 receives a start pulse signal SPG and display mode switch signals (hereinafter, referred to as control signals) A and A bar. When a level of the control signal A is a high level, a level of the control signal A bar is a low level. When a level of the control signal A is a low level, a level of the control signal A bar is a high level. An AND circuit $14b$, to which a start pulse signal SPG and the control signal A are input, is connected to one terminal 200 of the unit register 14a at first stage. When the level of the control signal A is the high level, the start pulse signal SPG is input to the one terminal 200. When the level of the control signal A is the low level, the start pulse signal SPG is not input to the one terminal 200. Furthermore, the start pulse signal SPG is input to a signal node Bu corresponding to an upper end of the area 2b of the display screen in the mode B via a clocked inverter 24a controlled by the control signal A bar, when the level of the control signal is the high level. The clocked inverter, for example, functions as follows: when the control signal A bar at the high level is input to the clocked inverter 24a, an inverted start pulse signal input to an input terminal a of the clocked inverter 24a is inverted by the clocked inverter 24a, and the start pulse signal SPG is then output from an output terminal b of the clocked inverter 24a. A signal at 0 level (ground level) is input to a signal node Bd corresponding to the lower end of the area 2b, via the clocked inverter 24b controlled by the control signal A bar.

In the case where the control signal A is at the high level (at 1 level), the shift register performs a normal shift operation. More specifically, the start pulse signal SPG is input from the one terminal 200. The shift register 14 sequentially shifts, in accordance with the clock signals φ and φ bar, the start pulse signal SPG from the unit register 14a to a unit register 14c. For reference, FIG. 11A shows a timing chart of the clock signal φ (φ bar), the start pulse signal SPG and the signals $X_1, X_2 \ldots X_i$ to be output to the scanning line 101. Waveforms of the clock signal φ (φ bar) and the start pulse signal SPG are not necessarily waveforms as shown by FIGS. 11A and 11B. This is the way the shift register 14 operates in the case where an image is displayed by using the data signal in the mode A.

On the other hand, in the case where the level of the signal A is the low level (0 level), a level of an output signal output from the AND circuit 14b to the unit register 14a is 0 level irrespective of the start pulse signal SPG. The output signal (at 0 level) is sequentially shifted based on the clock signals φ and φ bar. However, when a clocked inverter 25a of the shift register 14 located immediately before the signal node Bu corresponding to the upper end of the area 2b receives the control signal A at the low level, the output signal input to the clocked inverter 25a is not output from the clocked inverter 25a.

The start pulse signal SPG is input to the signal node Bu via an inverter and the clocked inverter 24a. In the portion corresponding to the area 2b after the signal node Bu of the shift register 14, the start pulse signal SPG is sequentially shifted based on the clock signals φ and φ bar. A clocked inverter 25b of the shift register 14 located immediately before the signal node Bd corresponding to the lower end of the area 2b of the shift register 14 is turned OFF because the control signal A at the low level is input to the clocked inverter 25b. As a result, the start pulse signal SPG is not shifted farther than the signal node Bd. For reference, FIG. 11B shows a timing chart of the start pulse signal SPG, the clock signal φ (φ bar) and the signal $X_1$ to be output to the scanning line 101.

To the signal node Bd is input a signal at 0 level via a clocked inverter 24b, and inverter and a ground. Thus, in the case where the control signal A is at 0 level, only in the area 2b where an image is displayed in the mode B, the signal at 0 level is sequentially output to the scanning signal lines 101.

In this case, the analog switches (sampling gates) 111 on the both sides of the display section where an image is displayed by using a data signal in the mode B may not be turned on. The signal output via a signal node in the middle of the shift register 14, to which a start pulse is input, may be output at a phase different from those of the signals output via other signal nodes.

More specifically, in some cases, the timing of the signal output from the signal node to which the start pulse signal of the shift register is input may be different from those of the signals output from the other signal nodes, because of the circuit configuration for inputting the start pulse signal SPG to the signal node.

Accordingly, this might cause a sampling timing difference in the display device. In order to avoid these situations, it is desirable for the unit registers constituting the shift register to selectively change the channel width of the channel length of transistors thereof, or to provide a load for delay in a required signal node of the shift register so as to match the timings.

Furthermore, the input node in the shift register 14 to be input the start pulse signal SPG is not always required to be precisely matched with the signal node of the shift register 14 corresponding to the boundary of the display area B. It should be taken into consideration to provide the input node outside the boundary by several pixels in view of overscanning.

In the above description, a configuration of the gate driver 4 has been described. A circuit 15 included in the source driver may have the same configuration as that of the gate driver except that the gate driver controls the row direction (horizontal scanning direction) of the liquid crystal display device, while the source driver controls the column direction (vertical scanning direction) of the liquid crystal display device. In such a case, SPG is replaced by SPS, and "from $X_1$ to $X_{j+1}$" by "from $Y_1$ to $Y_{j+1}$".

Figure 4A:
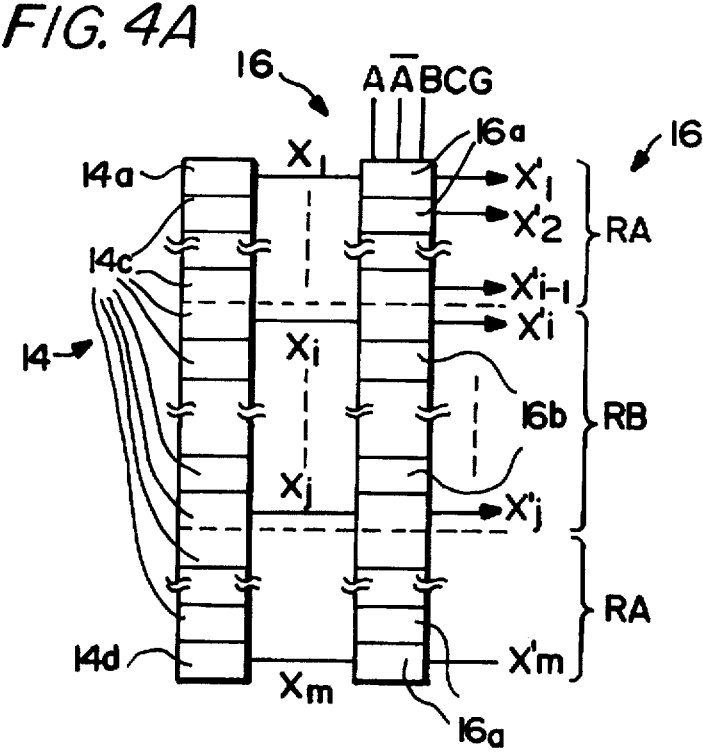
FIG. 4A is a diagram illustrating a logical gate group provided between the shift resister and a buffer on the output side thereof.
Figure 4B:
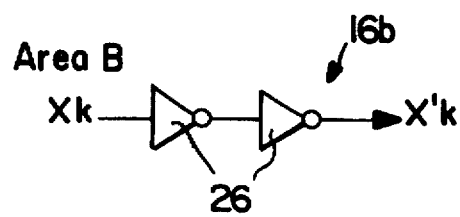
FIG. 4B is a diagram showing a unit logical circuit coupled to a scanning line which belongs to an area B.

Hereinafter, an example of the present invention, where the gate driver 4 shown in FIG. 2B further includes a logic circuit array 16, and the circuit 15 further includes a logic circuit array, will be described with reference to FIGS. 4A to 4C. In FIG. 4A, the logic circuit array 16 is provided between output terminals of the shift register 14 and a buffer (not shown). The logic circuit array 16 includes a plurality of unit logic circuits 16a and 16b corresponding to the output terminals at the respective stages of the shift register. Herein, $X_1, \ldots X_n$ denote output signals from the shift register. Signals $X'_1, \ldots X'_n$ are supplied from the gate driver to the scanning signal lines 101. It is assumed that the conversion of the pulse width or the like has been already performed by the logic gate so as to obtain a desired driving signal. An individual unit logic circuit 16b corresponding to the output region RB of the logic circuit array 16 shown in FIG. 4A has two inverters 26 connected in series, as shown in FIG. 4B. The unit logic circuit 16b allows the signal output from the shift register 14 to pass regardless of the control signal A, so as to output the signal to the buffer.

Figure 4C:
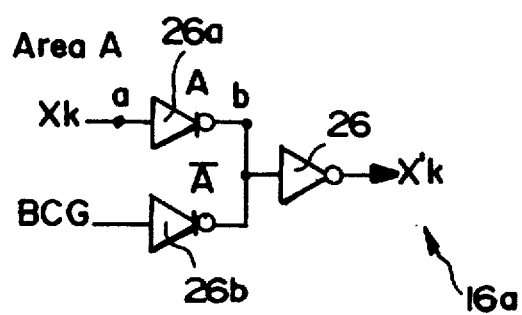
FIG. 4C is a diagram showing a unit logical circuit coupled to a scanning line which belongs to an area A.

On the other hand, an individual unit logic circuit 16a corresponding to an output region RA of the logic circuit array 16 shown in FIG. 4A has two clocked inverters 26a and 26b and an inverter 26, as shown in FIG. 4C. When the control signal A at the high level is input to the clocked inverter 26a which receives the signal output from the shift register 14, the signal input to an input terminal a of the clocked inverter 26a is inverted, and an inverted signal is output from an output terminal b of the clocked inverter 26a. Similarly, the clocked inverter 26b, which receives a margin sampling control signal BCG, inverts the margin sampling control signal BCG and outputs an inverted margin sampling control signal only when the clocked inverter 26b receives the control signal A bar at the high level. The inverter 26 receives the signal (the inverted signal or the inverted margin sampling control signal) output from the clocked inverter 26a or 26b.

In other words, the unit logic circuit 16a allows the output signal from the shift register 14 to pass and directly outputs the output signal to the buffer, when the level of the control signal A is the high level. When the level of the control signal A bar is the high level, the unit logic circuit 16a outputs the margin sampling control signal BCG to the buffer, instead of the signal output from the shift register 14. The margin sampling control signal BCG may be a digital signal input from outside of the liquid crystal display device. By using an appropriate margin sampling control signal BCG, an image can be displayed in the marginal area (the area left by removing the area 2b from the area 2a) at a desired gray scale level. This digital signal, which is the margin sampling control signal BCG, can be produced by a known method.

In the above description, a configuration of the gate driver 4 has been described. A circuit 15 included in the source driver may have the same configuration shown in FIG. 5 as that of the gate driver except that the gate driver controls the column direction (horizontal scanning direction) of the liquid crystal display device, while the source driver controls the row direction (vertical scanning direction) of the liquid crystal display device.

Figure 6A:
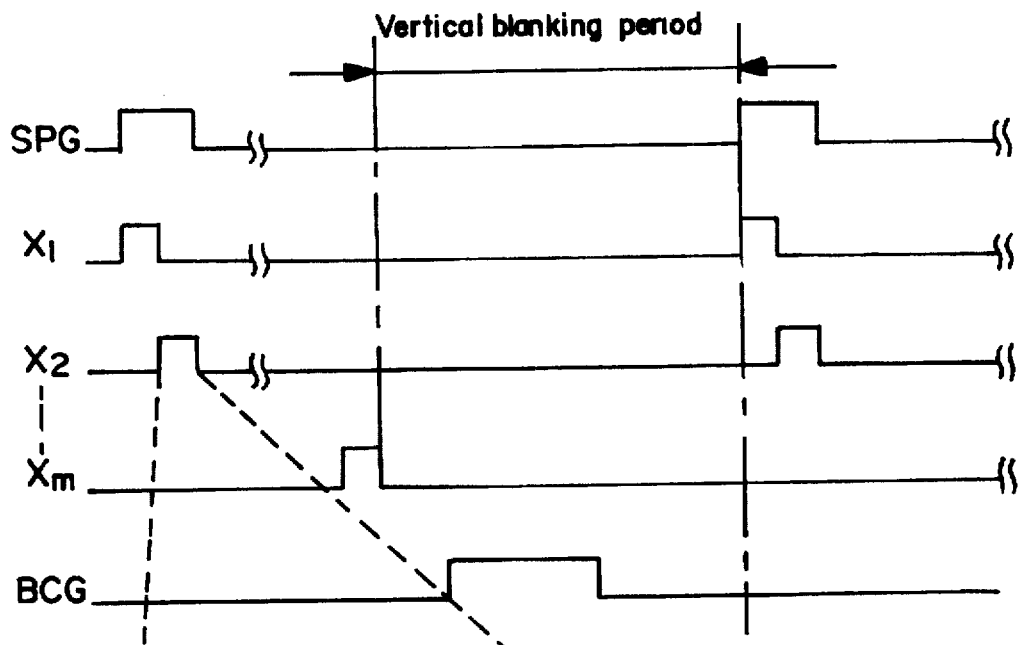
FIG. 6A is a timing chart showing operation timings of a scanning signal driver included in the display device of the first example.
Figure 6B:
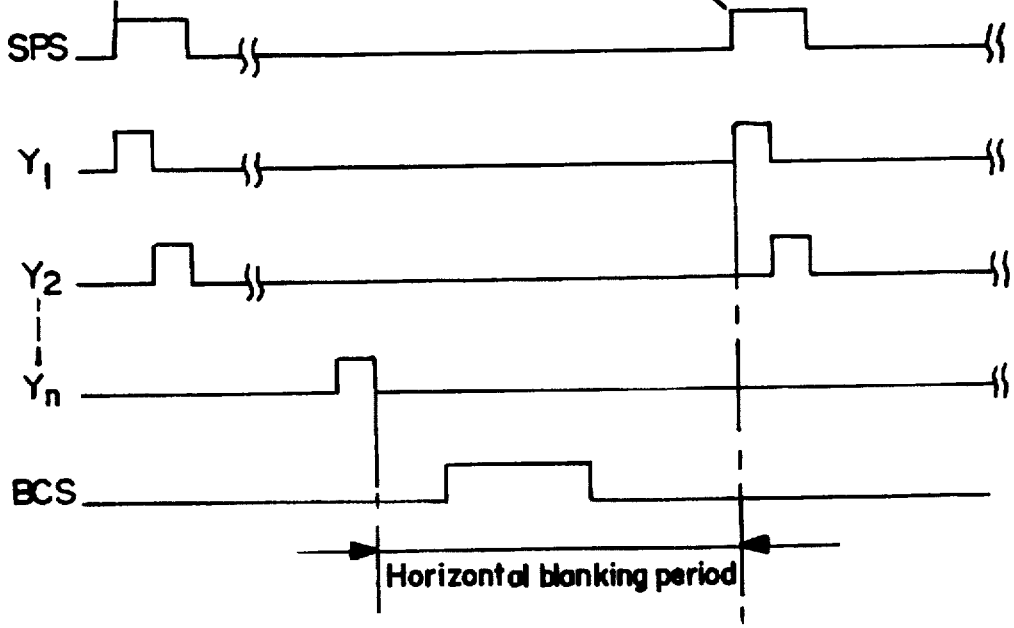
FIG. 6B is a timing chart showing operation timings of a data driver included in the display device of the first example.

FIGS. 6A and 6B show an exemplary driving timings of the respective drivers. FIG. 6A is a waveform chart illustrating operational timings of the gate driver (the scanning signal driver). FIG. 6B is a waveform chart illustrating operational timings of the source driver (the data driver).

The margin sampling control signal BCG shown in FIG. 6A is used for generating marginal areas in the upper and lower portions of the screen.

For example, the margin sampling control signal BCG shown in FIG. 6A is input to the scanning signal line 101 via the logic circuit array 16. At this time, the scanning signal line 101 which belongs to the area RA is selected for generating the marginal areas of the upper and lower portions of the screen. Next, a video signal (not shown) having the signal corresponding to the upper and lower marginal areas is input to the data bus line 102. Thus, the marginal areas are generated on the upper and lower portions of the screen. In this case, the source driver may not have the shift resister 14 and the logic circuit array 16 shown in FIG. 5.

The margin sampling control signal BCG shown in FIG. 6B is used for generating the marginal areas of the right and left portions of the screen.

For example, the margin data control signal BCS shown in FIG. 6B is input to the analog switch 111 via the logic circuit array 16. The analog switch 111 inputs or does not input a video signal to the data bus line 102 based on the margin data control signal BCS. Thus, the marginal areas are generated on the right and left portions of the screen. In this case, the gate driver may not have the shift resister 14 and the logic circuit array 16 shown in FIG. 4A.

Further, in the case where the gate driver includes the shift resister 14 and the logic circuit array 16 shown in FIG. 4A, and the source driver includes the shift resister 14 and the logic circuit array 16 shown in FIG. 5, the marginal areas are generated in the upper and lower, and right and left of the screen. The operation in this case is as follows.

The start pulse signal SPG includes information about a header of the marginal area in the vertical scanning direction. The start pulse signal SPG may include information about the time at which the marginal area is generated in the vertical direction, i.e., the period from the time at which the start pulse signal SPG is input to the shift resister to the time at which the margin is generated. Moreover, the start pulse signal SPG may include information about the time the margin ends.

FIG. 6B shows an exemplary timing of the data driver within a period corresponding to one scanning period of a scanning signal line $X_2$ shown in FIG. 6A. A video signal corresponding to the right and left marginal areas in the display section is input to the data signal lines 102 based on a margin data control signal BCS.

The start pulse signal SPS includes information about the head of the marginal area in the horizontal scanning direction. The start pulse signal SPS may include information about the time at which the marginal area is generated in the horizontal direction, i.e., the period from the time at which the start pulse signal SPS is input to the shift resister to the time at which the margin is generated. Moreover, the start pulse signal SPS may include information about the time the margin ends.

In the case where the shift resister 14 and/or the logic circuit array 16 are constructed by different circuits, for example, the unit logic circuit corresponding to the area RA and the unit logic circuit corresponding to the area RB are different, so that the delay times of the signals output from the different circuits are different. Therefore, there is a possibility that the sampling timings in the gate driver or the source driver are not synchronized.

In order to prevent the difference of the sampling timings, the amount of delay of a register which is shifted is adjusted to be matched with the amount of delay of a register which is not shifted. This is realized by adjusting the channel width of a transistor of the unit register, or providing a load for delay for a required signal node of the shift register so as to match the timings.

FIGS. 7A and 7B are timing charts illustrating the driving timings in the both modes. FIG. 7A is a timing chart showing the driving timings in the mode A, and FIG. 7B is a timing chart showing the driving timings in the mode B. Since an image to be displayed in the mode A has high resolution as compared with an image in the mode B, the driving frequency in the mode A is higher than that in the mode B. The duty ratio of the output pulses from the gate driver (scanning signal line driver) and the duty ratio of sampling pulses from the source driver (data signal line driver) differ between the mode A and the mode B.

An image can be displayed using a data signal (video signal) in the mode A by normally operating the driver, while only the central part of the shift register included in the driver is required to be scanned so as to display an image using a data signal in the mode B.

Next, the effects and the function of the first example of the present invention will be described below.

In this example, the method for scanning in the internal section of the driver is switched by the control signal A and A bar. In the display corresponding to a data signal in the mode B, a peripheral portion of the display screen becomes a margin, and a black display is usually performed in the peripheral portion. A video signal is written in the black display portion in the following manner.

With respect to the data signal in the mode B, an analog switch 111 corresponding to the marginal areas located on right and left sides of the displayed image is closed so as to write a corresponding video signal during a part of the horizontal blanking period. In the marginal areas located above and below the displayed image, scanning signal lines corresponding to a scanning signal of the vertical blanking period are scanned, and during period scanned the scanning signal lines, the corresponding video signal is written in the data signal lines by the source driver. In this method, the black display is not always performed on the margins, but the display can be performed at an arbitrary gray scale.

As described above, in this example, the gate driver (scanning signal driver) and the source driver (data driver) are controlled by the control signals A and A bar, so that marginal portions of a desired size can be formed in the upper and lower end portions and the right and left side portions of the display section without modulating the time axis of the video signals, and a plurality of display modes, each having a predetermined aspect ratio and a display capacitance, can be switched.

Example 2

Figure 8:
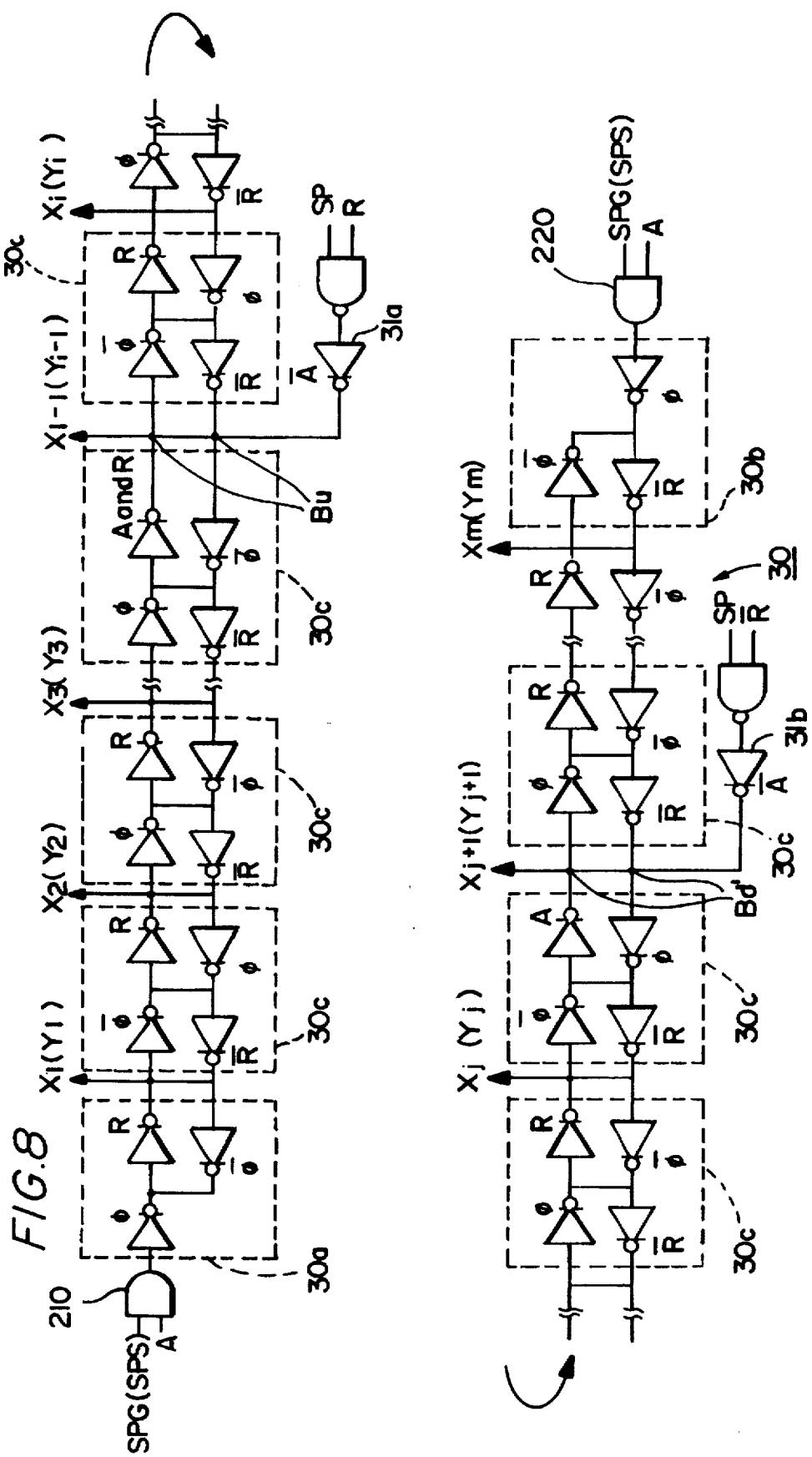
FIG. 8 is a diagram showing a circuit configuration of a shift resister included in a scanning signal driver (a data driver) of a display device of a second example according to the present invention.

FIG. 8 is a diagram illustrating a display device of a second example according to the present invention. In this example, a shift register included in each driver of the first example can perform a bidirectional scanning. The "bidirectional scanning" herein refers to the scanning performed in a first direction from a scanning signal line $X_j$ to a scanning signal line $X_{j+1}$ and in a second direction from the scanning signal line $X_{j+1}$ to the scanning line $X_j$. The shift register 30 includes unit registers 30a, 30b and 30C. Each of the unit registers 30a and 30b has three clocked inverters. Each of the unit registers 30C includes four clocked inverters. Scanning direction signals R and R bar input to the shift register 30 functions as a signal for switching the scanning direction of the shift register. The start pulse signal SPG and the control signal A is input to AND circuits 210 and 220. The unit registers 30a and 30c receive the logical product of the start pulse signal SPG and the control signal A.

The logical product of the start pulse signal SPG and the scanning direction signal R is input to a signal node Bu' corresponding to the left end (or the upper end) of the display screen in the mode B via the clocked inverter 31a, only when a level of the signal A bar is a high level (1 level). The logical product of the start pulse signal SPG and the scanning direction signal R bar is input to a signal node Bd' corresponding to the right end (or the lower end) of the display screen in the mode B via the clocked inverter 31b, only when the level of the control signal A bar is the high level (1 level).

When a level of the control signal A is a high level, the entire shift register 30 is scanned and the scanning direction (the first direction or the second direction) can be switched by the scanning direction signal.

On the other hand, when the level of signal A bar is the high level, only the area of the shift register 30 corresponding to the display screen in the mode B is scanned, and the scanning direction can be switched by the scanning direction signal in the scanning area. In this case, the logic gate array as shown in FIGS. 3A and 4 may also be provided between the shift register 30 and a buffer. Therefore, the same displayed image as that of the first example can be obtained.

The shift register included in the gate driver has been described so far, but a similar shift register can be included in the source driver. In this case, 'SPG' is replaced by 'SPS' and 'from $X_1$ to $X_n$' by 'from $Y_1$ to $Y_n$'. The number of the data signal lines 102 in the vertical direction and the number of the scanning signal lines 101 in the horizontal direction can be different from each other.

Example 3

FIGS. 9A to 9D are diagrams illustrating a display device of a third example according to the present invention. In these figures, the shift register included in the gate driver and the source driver of the first example is replaced by a decoder.

Figure 9A:
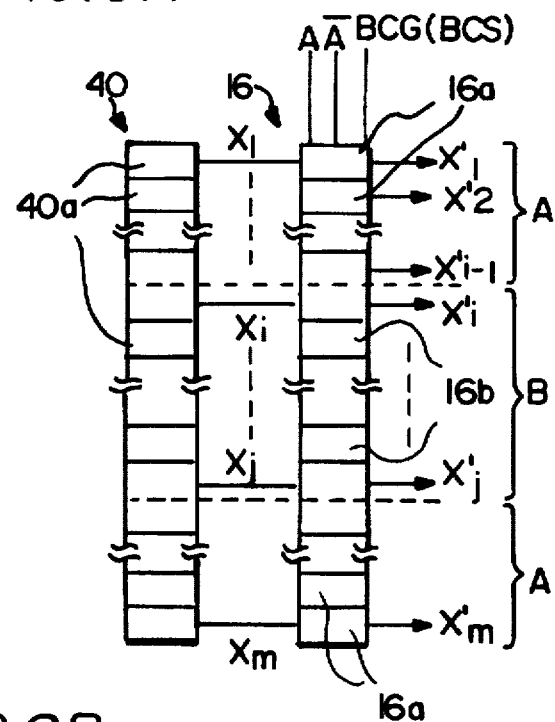
FIG. 9A is a diagram showing a circuit configuration of a shift resister included in a scanning signal driver of the display device of the third example.
Figure 9B:
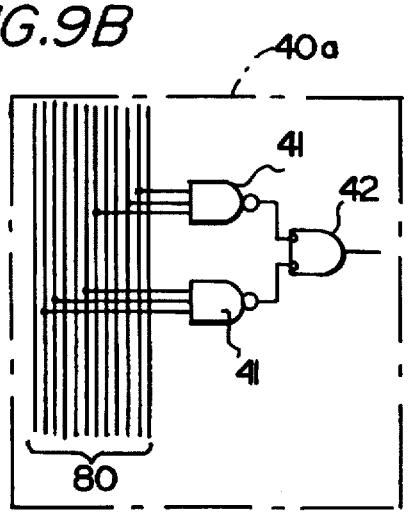
FIG. 9B is a detailed diagram showing a unit selection of the circuit shown in FIG. 9A.
Figure 9C:
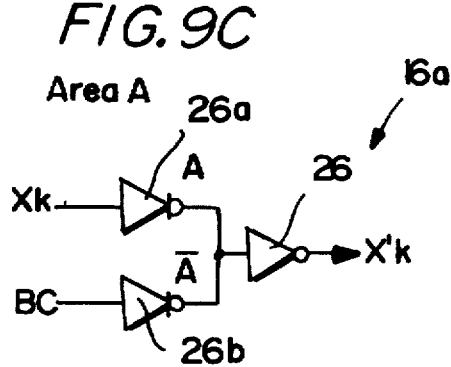
FIG. 9C is a diagram showing a unit logical circuit coupled to a scanning line which belongs to an area A.
Figure 9D:
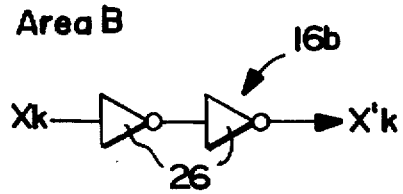
FIG. 9D is a diagram showing a unit logical circuit coupled to a scanning line which belongs to an area B.

In FIG. 9A, reference numeral 40 denotes a decoder included in the gate driver. The decoder 40 includes a plurality of unit selection circuits 40a corresponding to respective scanning signal lines 80, as shown in FIG. 9B. The outputs of the respective unit selection circuits 40a are connected to corresponding unit logic circuits 16a and 16b of the logic circuit array in the same manner as in the first example. The unit logic circuits 16a and 16b have exactly the same configurations as those of the first example, as shown in FIGS. 9C and 9D. As shown in FIG. 9B, the unit selection circuit 40a has two NAND circuits 41 for receiving a plurality of output selected data signals from a plurality of lines 80 and an AND circuit 42 to which the outputs of the NAND circuits 41 are input. The plurality of output selected data signals are used for selecting one signal of the output signals $X_1$ to $X_n$.

In the display device of this example having such a configuration, in the same way as the display device of the first example in which the shift register is used, a data signal in a plurality of display modes, which are different in the number of pixels arranged in the row direction and the column direction of a liquid crystal display device, can be displayed in a single display device by switching the operations without modulating the time axis of the data signal (i.e., video signal). The switching of the operations can be advantageously and easily performed by switching a data control signal.

Furthermore, in the display device of this example, the scanning area in the decoder 40, i.e., the range where the unit selection circuits are driven, can be changed and the scanning timing, i.e., the driving timing for the unit selection circuits can be changed by changing the data control signal.

Example 4

Figure 10A:
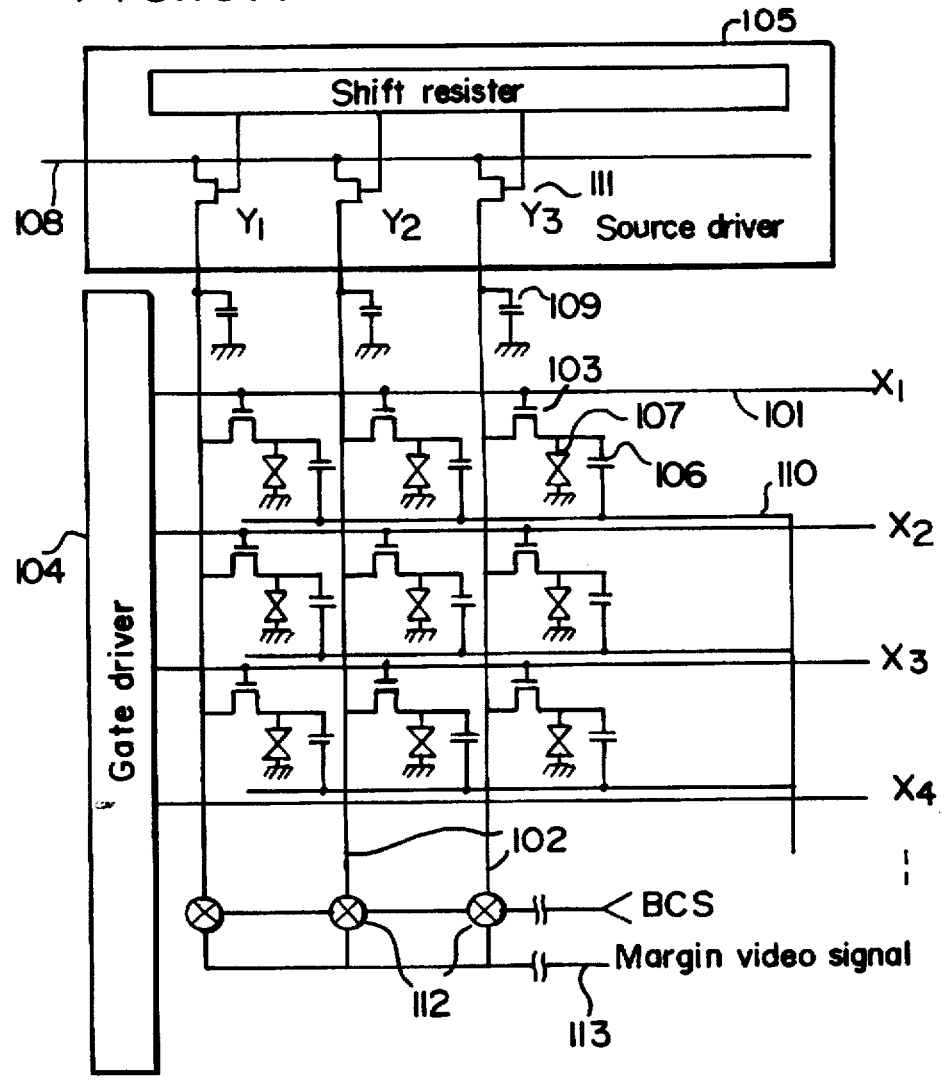
FIG. 10A is a diagram showing a configuration of a driver included in a display device of a fourth example according to the present invention.

FIG. 10A is a diagram illustrating a display device of a fourth example according to the present invention. The display device of the fourth example has the same configuration as that of the display device of the first example except that an analog switch 112 for inputting a margin video signal to a data bus line (data signal line) 102 is further included in the display device of the fourth example. Each analog switch 112 is connected between a margin video signal input line 113 and the data signal line 102.

The analog switch 112 corresponding to the right and left marginal areas in the display screen in the mode B is turned ON/OFF by a control signal BCS.

In this example, in addition to the effects obtained in the first example, it is no longer necessary to insert a video signal corresponding to a margin into a blanking portion when a video signal in a row direction is scanned. Thus, the configuration of the external control circuit is simplified.

Figure 10B:
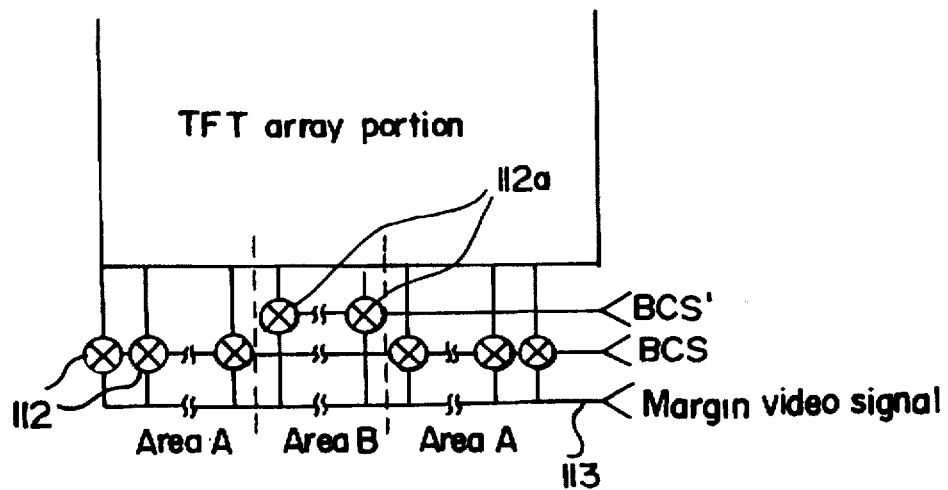
FIG. 10B is a detailed diagram showing a portion of the configuration of the driver shown in FIG. 10A.

Moreover, a margin video signal can be input to the data signal lines corresponding to the area other than the marginal areas on right and left sides of the image displayed in the mode B via the analog switch 112a to be turned ON/OFF by another control signal BCS' (FIG. 10B). As a result, a video signal corresponding to the marginal areas above and below the image displayed in mode B can be input through the analog switch 112a.

As described above, according to the present invention, the shift register included in the scanning signal driver or the data driver has a configuration in which the node to which the start pulse signal is input is set by a control signal, the operation of the unit register immediately before the set node can be interrupted by the control signal, and the control signal can switch either or both of the start position and the termination position of the shift operation. As a result, in the shift register of the invention, the dimension of the marginal area on the display screen can be varied by shifting a selection signal from one terminal side to the other terminal side through the scanning signal line and the data signal line. Thus, an image in a plurality of display modes which are different in the number of pixels arranged in the row direction and the column direction can be displayed in accordance with the display modes of the data signal without modulating the time axis of the data signal.

More specifically, with respect to the video signal for an image to be displayed on a large-scale display screen, the shift operation is performed through the entire range of the shift register, while with respect to the video signal for an image to be displayed on a small-sized display screen, the shift operation is performed in a limited range of the shift register. As a result, a marginal area of a desired size can be formed in the upper and lower end portions or the right and left side portions of the display section without modulating the time axis of the data signal, thereby switching a plurality of display modes each having a predetermined aspect ratio or a display capacitance.

According to the present invention, at least one of the scanning signal driver and the data driver is controlled by a display switching signal. By switching the display in this way, the peripheral portions on the display screen can be used as marginal areas. As a result, with respect to a video signal for an image to be displayed on a large-scale display screen, the image is displayed in the entire portion of the display screen. On the other hand, with respect to a video signal for an image to be displayed on a small-sized display screen, the image is displayed in a limited range of the display screen, excluding the peripheral portions of the display screen to be used as marginal areas. Thus, marginal areas of a desired size can be formed in the upper and lower end portions and the right and left side portions of the display section without modulating the time axis of the data signals, thereby switching a plurality of display modes each of which has a predetermined aspect ratio or a display capacitance.

A display device according to the present invention includes a decoder having a plurality of output nodes and outputting a signal to a predetermined output node based on a plurality of input signals, and a logic gate for receiving the signal from each output node of the decoder so as to output the signal to a buffer as a scanning signal or a sampling gate control signal. In the logic gate, the decoding output is output to the buffer without performing any processing, in the region of the decoder where the decoding output to each output node is sequentially switched, while either one of the decoding output or another different signal is output to the buffer based on the control signal, in the region of the decoder where the decoding output to each output node is constant. As a result, an image in a plurality of display modes which are different in the number of pixels arranged in the row direction and the column direction can be displayed in accordance with the display modes of the data signal without modulating the time axis of the data signal.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A driving circuit for sequentially scanning a plurality of scanning signal lines, the driving circuit comprising a shift register having a plurality of unit registers and nodes, each of the plurality of unit registers being connected to the corresponding scanning signal line, a start signal input to a selected node at a beginning of a set of consecutive nodes being sequentially shifted to an adjacent unit register in the set of consecutive registers based on a standard signal, the adjacent unit register connected to the selected node being allowed to be in a non-operational state based on a first state of a control signal applied to the selected node, and wherein, when the control signal has the first state, a subsequent node in the set of consecutive registers receives a different control signal for rendering operational at least some of the unit registers which follow the subsequent node in the set of consecutive registers, the start signal input to the selected node being output from the selected node and eventually to the subsequent node based on a second state of the control signal.

2. A driving circuit for driving and controlling a plurality of scanning signal lines and a plurality of sampling gates for sampling a data signal, the driving circuit comprising:

a shift register having a plurality of unit registers, the plurality of unit registers being connected to one of the corresponding scanning signal lines and the corresponding sampling gates;

wherein the shift register includes a start signal input to a selected node at a beginning of a set of consecutive nodes being sequentially shifted to an adjacent unit register in the set of consecutive registers based on a standard signal, the adjacent unit register connected to the selected node being allowed to be in a non-operational state based on a first state of a control signal applied to the selected node, and wherein, when the control signal has the first state, a subsequent node in the set of consecutive registers receives a different control signal for rendering operational at least some of the unit registers which follow the subsequent node in the set of consecutive registers, the start signal input to the selected node being output from the selected node and eventually to the subsequent node based on a second state of the control signal, and a logic gate array for receiving a holding signal which each unit register of the shift register holds, and outputting the holding signal to a buffer as one of a scanning signal and a sampling gate control signal, and wherein a start signal is stored in the unit register to which the start signal is input via the selected node, and the start signal is shifted from the unit register in which the start signal is stored to a unit register adjacent to the unit register in which the start signal is stored based on the standard signal and wherein the logic gate array outputs the signal output from the unit register to a buffer in a logic gate receiving a signal output from the unit register to which the start signal is shifted, and outputs a signal to the buffer in a logic gate receiving a signal output from the unit register to which the start signal is not shifted.

3. A display device comprising:
a display portion having a plurality of scanning signal lines and a plurality of data signal lines arranged so as to cross the plurality of scanning signal lines, and displaying an image by applying a voltage to an intersecting portion between the scanning signal line and the data signal line;
a scanning signal driving circuit for sequentially scanning the plurality of scanning signal lines;
a data driving circuit for sequentially driving the plurality of data signal lines;
wherein at least one of the scanning signal driving circuit and the data driving circuit includes a shift register having a plurality of unit registers and nodes,
each of the plurality of unit registers being connected to the corresponding scanning signal line,
a start signal input to a selected node at a beginning of a set of consecutive nodes being sequentially shifted to an adjacent unit register in the set of consecutive registers based on a standard signal,
the adjacent unit register connected to the selected node being allowed to be in a non-operational state based on a first state of a control signal applied to the selected node, and wherein, when the control signal has the first state, a subsequent node in the set of consecutive registers receives a different control signal for rendering operational at least some of the unit registers which follow the subsequent node in the set of consecutive registers,
the start signal input to the selected node being output from the selected node, and eventually to the subsequent node based on a second state of the control signal,
wherein at least one of the scanning signal driving and the data driving is controlled by a display switching signal, and a marginal area of a display screen is made to be blank regions by the display switching.

4. A display device according to claim 3, wherein at least one of the scanning signal driving circuit and the data driving circuit is obtained by serially connecting a plurality of unit registers corresponding to one of the scanning signal lines and the data signal lines, and has a shift register for shifting a start signal input to a predetermined node to an adjacent unit register based on a standard signal;
the shift register has an terminal node and a middle node; and
the start signal input to the terminal node and the middle node are controlled by a control signal.

5. A display device according to claim 3, wherein a data circuit sequential drives a plurality of sampling gates for sampling a data signal;
at least one of the scanning signal driving circuit and the data driving circuit includes:
a shift register having a plurality of unit registers, the plurality of unit registers being connected to one of the corresponding scanning signal lines and the corresponding sampling gates, one of the plurality of unit registers receiving a start signal via a predetermined middle node, the shift register for shifting a start signal stored in a unit register to a unit register adjacent to the unit register in which the start signal is stored;
a logic gate array for receiving a holding signal which each unit register of the shift register holds, and outputting one of a scanning signal and a sampling gate control signal to a buffer;
in the case where a first logic gate in the logic gate array receives a first signal output from the unit register which shifts the start signal, the first logic gate outputs the first signal to a buffer in the logic gate array; and
in the case where a second logic gate in the logic gate array receives a second signal output from the unit register which does not shift the start signal, the second logic gate outputs the second signal to a buffer in the logic gate array.

6. A display device comprising:
a display portion having a plurality of scanning signal lines and a plurality of data signal lines arranged so as to cross the plurality of scanning signal lines, and displaying an image by applying a voltage to an intersecting portion between the scanning signal line and the data signal line;
a scanning signal driving circuit for sequentially scanning the plurality of scanning signal lines;
a data driving circuit for sequentially driving the plurality of data signal lines;
wherein at least one of the scanning signal driving and the data driving is controlled by a display switching signal, and a marginal area of a display screen is made to be blank regions by the display switching;
wherein a data circuit sequentially drives a plurality of sampling gates for sampling a data signal;
wherein at least one of the scanning signal driving circuits and the data driving circuit includes:
a shift register having a plurality of unit registers, the plurality of unit registers being connected to one of the corresponding scanning signal lines and the corresponding sampling gates, one of the plurality of unit registers receiving a start signal via a predetermined middle node, the shift register for shifting a start signal stored in a unit register to a unit register adjacent to the unit register in which the start signal is stored;
a logic gate array for receiving a holding signal which each unit register of the shift register holds, and outputting one of a scanning signal and a sampling gate control signal to a buffer;
in the case where a first logic gate in the logic gate array receives a first signal output from the unit register which shifts the stat signal, the first logic gate outputs the first signal to a buffer in the logic gate array; and
in the case where a second logic gate in the logic gate array receives a second signal output from the unit register which does not shift the start signal, the second logic gate outputs the second signal to a buffer in the logic gate array;
wherein the shift register has a terminal node and selects either the terminal node or the middle node based on a control signal, and the selected node receives the start signal.

7. A display device comprising:
a display portion having a plurality of scanning signal lines and a plurality of data signal lines arranged so as to cross the plurality of scanning signal lines, and displaying an image by applying a voltage to an intersecting portion between the scanning signal line and the data signal line;
a scanning signal driving circuit for sequentially scanning the plurality of scanning signal lines;
a data driving circuit for sequentially driving the plurality of data signal lines;

wherein at least one of the scanning signal driving and the data driving is controlled by a display switching signal, and a marginal area of a display screen is made to be blank regions by the display switching;

wherein at least one of the scanning signal driving circuit and the data driving circuit is obtained by serially connecting a plurality of unit registers corresponding to one of the scanning signal lines and the data signal lines, and has a shift register for shifting a start signal input to a predetermined node to an adjacent unit register based on a standard signal;

the shift register has a terminal node and a middle node; and the start signal input to the terminal node and the middle node are controlled by a control signal;

wherein the shift register can perform a shift operation in both directions.

8. A display device comprising:

a display portion having a plurality of scanning signal lines and a plurality of data signal lines arranged so as to cross the plurality of scanning signal lines, and displaying an image by applying a voltage to an intersecting portion between the scanning signal line and the data signal line;

a scanning signal driving circuit for sequentially scanning the plurality of scanning signal lines;

a data driving circuit for sequentially driving the plurality of data signal lines;

wherein at least one of the scanning signal driving and the data driving is controlled by a display switching signal, and a marginal area of a display screen is made to be blank regions by the display switching;

wherein at least one of the scanning signal driving circuit and the data driving circuit is obtained by serially connecting a plurality of unit registers corresponding to one of the scanning signal lines and the data signal lines, and has a shift register for shifting a start signal input to a predetermined node to an adjacent unit register based on a standard signal;

the shift register has a terminal node and a middle node; and the start signal input to the terminal node and the middle node are controlled by a control signal;

first delay time adjusting means for adjusting a first amount of delay of a signal output from the node which receives the start signal and a second amount of delay of the output signal from the unit register so as to equalize the first amount with the second amount.

9. A display device comprising:

a display portion having a plurality of scanning signal lines and a plurality of data signal lines arranged so as to cross the plurality of scanning signal lines, and displaying an image by applying a voltage to an intersecting portion between the scanning signal line and the data signal line;

a scanning signal driving circuit for sequentially scanning the plurality of scanning signal lines;

a data driving circuit for sequentially driving the plurality of data signal lines;

wherein at least one of the scanning signal driving and the data driving is controlled by a display switching signal, and a marginal area of a display screen is made to be blank regions by the display switching;

wherein a data circuit sequentially drives a plurality of sampling gates for sampling a data signal;

wherein at least one of the scanning signal driving circuit and the data driving circuit includes:

a shift register having a plurality of unit registers, the plurality of unit registers being connected to one of the corresponding scanning signal lines and the corresponding sampling gates, one of the plurality of unit registers receiving a start signal via a predetermined middle node, the shift register for shifting a start signal stored in a unit register to a unit register adjacent to the unit register in which the start signal is stored;

a logic gate array for receiving a holding signal which each unit register of the shift register holds, and outputting one of a scanning signal and a sampling gate control signal to a buffer;

in the case where a first logic gate in the logic gate array receives a first signal output from the unit register which shifts the start signal, the first logic gate outputs the first signal to a buffer in the logic gate array; and in the case where a second logic gate in the logic gate array receives a second signal output from the unit register which does not shift the start signal, the second logic gate outputs the second signal to a buffer in the logic gate array;

a second delay time adjusting means for adjusting a first amount of delay of output signals from unit register which do not shift the start signal and a second amount of delay of output signals from unit register which shifts the start signal so as to equalize the first amount with the second amount.

10. A display device according to claim 3, wherein the display device sequentially drives and controls a plurality of gates for sampling a data signals;

one of the scanning signal driving circuit and the data driving circuit includes:

a decoder having a plurality of output nodes and outputting one of a first signal and a second signal to a predetermined output node based on a plurality of input signals; and a logic gate array for receiving a signal from each output node of the decoder and outputting the signal to a buffer as one of a scanning signal and a sampling gate control signal; and wherein the plurality of output nodes is classified into a first group and a second group wherein the first signal is output from the decoder to the logic gate array via the output node of the first group, wherein one of the first signal and the second signal is output from the decoder to the logic gate array via the output node of the second group, based on a control signal.

11. A display device comprising:

a display portion having a plurality of scanning signal lines and a plurality of data signal lines arranged so as to cross the plurality of scanning signal lines, and displaying an image by applying a voltage to an intersecting portion between the scanning signal line and the data signal line;

a scanning signal driving circuit for sequentially scanning the plurality of scanning signal lines;

a data driving circuit for sequentially driving the plurality of data signal lines;

wherein at least one of the scanning signal driving and the data driving is controlled by a display switching signal, and a marginal area of a display screen is made to be blank regions by the display switching;

wherein the display device sequentially drives and controls a plurality of gates for sampling a data signal;

one of the scanning signal driving circuit and the data driving circuit includes:

a decoder having a plurality of output nodes and outputting one of a first signal and a second signal to a predetermined output node based on a plurality of input signals; and a logic gate array for receiving a signal from each output node of the decoder and outputting the signal to a buffer as one of a scanning signal and a sampling gate control signal; and wherein the plurality of output nodes is classified into a first group and a second group wherein the first signal is output from the decoder to the logic gate array via the output node of the first group, wherein one of the first signal and the second signal is output from the decoder to the logic gate array via the output node of the second group, based on a control signal;

first delay time adjusting means for adjusting a first amount of delay of a signal output from the output node of the first group and a second amount of delay of the output signal from the output node of the second group so as to equalize the first amount with the second amount.

12. A display device according to claim 3, wherein a video signal corresponding to a blank area displayed in a marginal portion of the display screen is supplied from the data driving circuit to each data signal line during one of a horizontal blanking period and a vertical blanking period.

13. A display device comprising:

a display portion having a plurality of scanning signal lines and a plurality of data signal lines arranged so as to cross the plurality of scanning signal lines, and displaying an image by applying a voltage to an intersecting portion between the scanning signal line and the data signal line;

a scanning signal driving circuit for sequentially scanning the plurality of scanning signal lines;

a data driving circuit for sequentially driving the plurality of data signal lines;

wherein at least one of the scanning signal driving and the data driving is controlled by a display switching signal, and a marginal area of a display screen is made to be blank regions by the display switching;

wherein at least a part of the video signal corresponding to a blank area displayed in a marginal portion of the display screen is supplied to each data signal line during one of a horizontal blanking period and a vertical blanking period through another analog switch other than an analog switch which supplies a video signal from the data driving circuit to the data signal line.

14. A display device comprising:

a plurality of scanning signal lines being classified into a predetermined first group and a predetermined second group;

a plurality of data signal lines being classified into a predetermined first group and a predetermined second group;

a gate driver for receiving a first control signal, for further receiving a first sampling control signal, for supplying a corresponding first scanning pulse signal to the plurality of scanning signal lines when the first control signal is in a first state, for supplying a corresponding second scanning pulse signal to the scanning signal lines of the predetermined first group and supplying a non-selection signal to the scanning signal lines of the predetermined second group based on the first sampling control signal when the first control signal is in a second state; and a source driver for receiving a second control signal, further receiving a second sampling control signal, supplying a corresponding first data pulse signal to the plurality of data signal lines when the second control signal is in a first state, supplying a corresponding second data pulse signal to the data signal lines of the predetermined first group, and supplying a marginal signal to the data signal lines of the predetermined second group based on the data control signal when the second control signal is in a second state; and wherein a width of the first scanning pulse signal is shorter than a width of the second scanning pulse signal; and wherein a width of the first data pulse signal is shorter than a width of the second data pulse signal.

15. A display device according to claim 14, wherein the non-selection signal is at a low level, and the marginal signal is at a low level.

16. A display device comprising a gate driver for supplying a corresponding signal to a plurality of scanning signal lines, a source driver for receiving an image signal, extracting an image data from the image signal and supplying the corresponding image data to a plurality of data signal lines, and display means for displaying the image data based on the signal, wherein the plurality of scanning signal lines is classified into a predetermined first group and a predetermine second group, the gate driver receives a control signal and further receives a sampling control signal, the gate driver supplies a corresponding first scanning pulse signal to the plurality of scanning signal lines when the control signal is in a first state, the gate driver supplies a corresponding second scanning pulse signal to scanning signal lines of the predetermined first group and supplies a non-selection signal to scanning signal lines of the predetermined second group based on the sampling control signal when the control signal is in a second state; and a width of the first scanning pulse signal is shorter than a width of the second scanning pulse signal.

17. A display device according to claim 16, wherein the gate driver includes a shift register array having a plurality of shift resisters corresponding to the scanning signal lines, and a logic circuit array having a plurality of logic circuits, The shift register array receives a start signal and a clock signal supplied from outside of the display device, supplies the start signal stored in a shift register to the logic circuit corresponding to the shift register based on the clock signal, and shifts the start signal to a shift register adjacent to the shift register in which the start signal is stored, and the logic circuit array supplies non-selection signals to the scanning signal lines of the second based on the sampling control signal, and generates the second scanning signal based on the start signal output from the shift register.

18. A display device comprising a gate driver for supplying a corresponding scanning signal to a plurality of scanning signal lines, a source driver for receiving an image signal, extracting a data from the image signal and supplying the corresponding data to a plurality of data signal lines, and display means for displaying the data based on the scanning signal, wherein the plurality of data signal lines is classified into a predetermined first group and a predetermined second group, the source driver receives a control signal and further receives a sampling control signal, the source driver supplies a corresponding first data pulse signal to the plurality of data signal lines when the control signal is in a first state, the source driver supplies a corresponding second data pulse signal to scanning signal lines of the predetermined first group and supplies a marginal signal to data signal lines of the predetermined second group based on the data control signal when the control signal is in a second state, and a width of the first data pulse signal is shorter than a width of the second data pulse signal.

19. A display device according to claim 18, wherein the source driver includes a shift register array having a plurality of shift resisters corresponding to the data signal line, and a logic circuit array having a plurality of logic circuits, the shift register array receives a start signal and a clock signal supplied from outside of the display device, supplies the start signal stored in a shift register to the logic circuit corresponding to the shift register based on the clock signal, and shifts the start signal to a shift register adjacent to the shift register in which the start signal is stored, and the logic circuit array supplies the marginal signals to the data signal lines of the second based on the data control signal, and generates the second data signal based on the start signal output from the shift register.

20. A driving circuit for sequentially scanning a plurality of scanning signal lines, the driving circuit comprising a shift register having a plurality of unit registers and nodes, each of the plurality of unit registers being connected to the corresponding scanning signal line, a start signal input to a node being sequentially shifted to an adjacent unit register based on a standard signal when a control signal is at a first state such that a first portion of scanning signal lines are driven and the driving circuit operates in a first display mode; and the start signal input to another node being sequentially shifted to an adjacent unit register based on the standard signal when the control signal is at a second state such that a second portion of the scanning signal lines are driven and the driving circuit operates in a second display mode.

* * * * *